June 27, 1961  I. WOLAR  2,990,153
HANGERS FOR CORD SUPPORTED FIXTURES
Filed Dec. 13, 1954
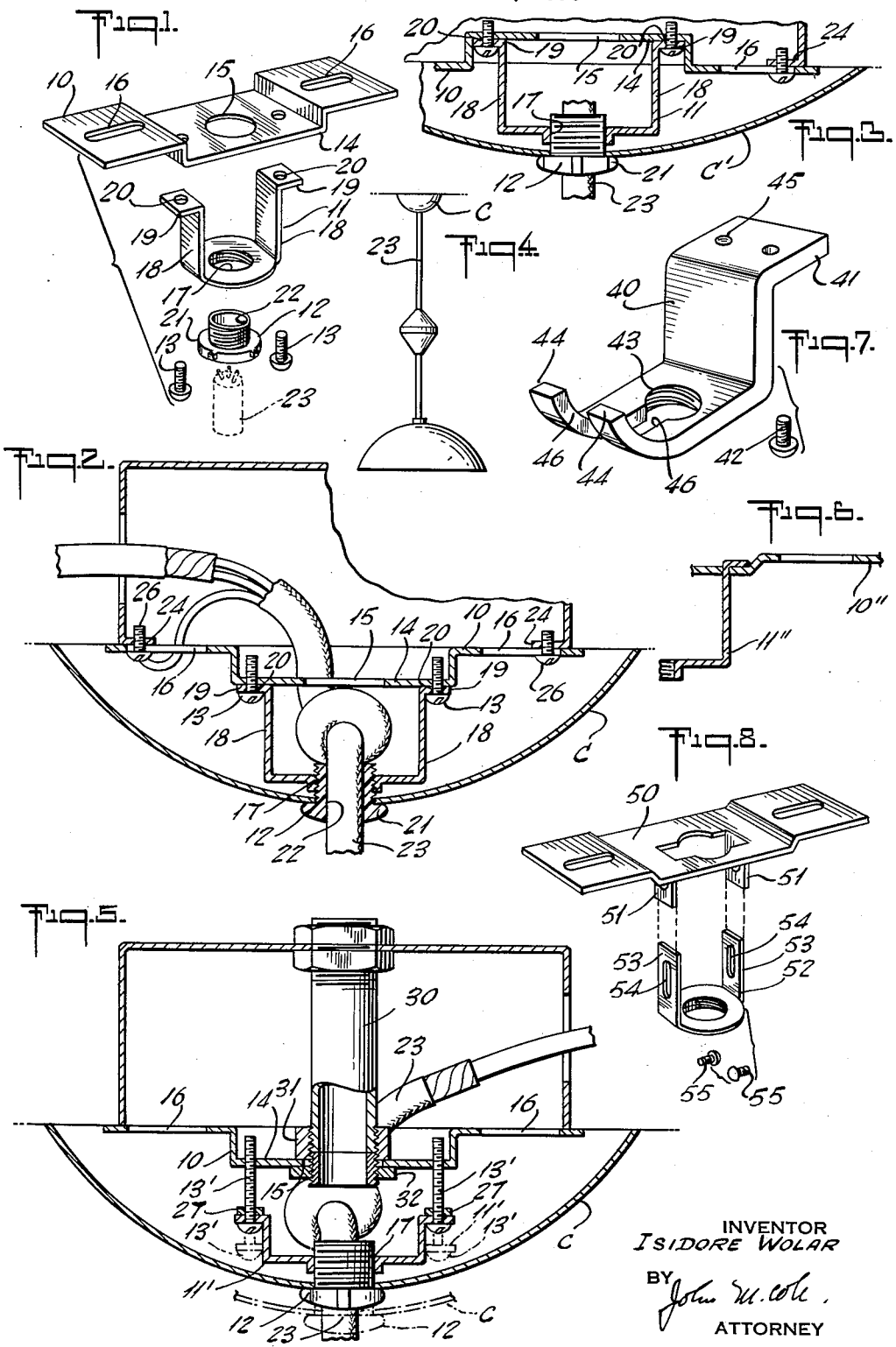
INVENTOR
ISIDORE WOLAR
BY John M. Cole
ATTORNEY

2,990,153
HANGERS FOR CORD SUPPORTED FIXTURES

Isidore Wolar, 290 Collins Ave., Mount Vernon, N.Y.
Filed Dec. 13, 1954, Ser. No. 474,691
1 Claim. (Cl. 248—343)

The present invention relates to hangers for cord supported fixtures and is more particularly directed toward the support of such fixtures from the conventional outlet boxes mounted in the ceiling.

Lighting fixtures of the type having a flexible cord with the insulated wires and reinforcing threads encased in a braided sheath and arranged for variable fixture height by means of a take-up reel have become very poular. The conventional devices for mounting stem type and chain type fixtures are not adapted for supporting such cord type fixtures, and the devices heretofore available have been unduly expensive and cumbersome.

The present invention contemplates hangers for these purposes made out of simple, inexpensive sheet metal parts, screws and an insulating bushing, and arranged so that the metal parts may be secured either to the ears on the outlet box or a central stud carried by the outlet box, and so that the fixture cord, carrying the canopy and an insulating bushing, may be passed through an opening in one of the outlet-box-carried parts and held there by a knot made in the cord.

The present invention contemplates several forms of construction for these purposes wherein it is possible to arrange the outlet-box-carried parts so that room is provided for canopies of varying depths.

Other and further objects will appear as the description proceeds.

The accompanying drawings show, for purposes of illustrating the present invention, several embodiments in which the invention may take form, it being understood that the drawings are illustrative of the invention rather than limiting the same.

In the accompanying drawings:

FIGURE 1 is an exploded perspective view showing the component parts of one form of construction;

FIGURE 2 is a vertical sectional view showing the component parts of FIGURE 1 assembled in position to accommodate a relatively deep canopy, secured to the ears of an outlet box, and supporting a fixture cord and canopy;

FIGURE 3 is a section similar to FIGURE 2 showing the assembly of the parts for a shallow canopy;

FIGURE 4 is an outline view of a pendant lighting fixture;

FIGURE 5 is a sectional view showing a modified form of construction and illustrating its support from an outlet box stud;

FIGURE 6 is a fragmentary sectional view illustrating a form of construction utilizing welding rather than screws for securing the parts together;

FIGURE 7 is a perspective view showing an L-shaped bracket instead of the U-shaped bracket of the other figures; and FIGURE 8 is a perspective view showing the component parts for a further modified form of construction.

The construction shown in FIGURES 1–4 utilizes the parts shown in FIGURE 1 which include a sheet metal bridging strap 10, a bracket in the form of a sheet metal U-shaped member 11, an insulating bushing 12 and two screws 13, 13. The strap 10, which may be made from 14 gage stock, has an offset central portion 14 with a central aperture 15 and its ends have slots 16, 16. The offset is preferably about ¼″, as this permits a variation of mounting height of the U-shaped member of nearly ½″ upon inversion of the strap. The U-shaped member 11, which may be made of 10 gage metal, has a central, threaded hole 17 and two upwardly extending legs 18, 18, provided with outwardly extending flanges or bracket-like ends 19, 19 apertured as indicated at 20, 20. The bushing 12 is threaded to fit the threaded hole 17 and is outwardly flanged at 21. Its central hole 22 is of a size to receive the multiple conductor cord 23 commonly used with lighting fixtures of the type having reels to facilitate vertical adjustment.

The U-shaped member 10 and bridging strap may be secured together by the screws 13 with the offset portion down as in FIGURE 2 or up as in FIGURE 3. The bridging strap and the U-shaped member may be secured to one another in the desired relation and then secured to the ears 24 of the outlet box 25 by screws 26, as shown in FIGURES 2 or 3. These parts are then ready to receive the fixture cord.

In the arrangement shown in FIGURE 5 the same bridging strap 10 is used, or one with the usual shallow offset for stiffness, but here the U-shaped member 11′ is shorter and the screws 13′, 13′ longer, for example 1″. Lock nuts 27 on the screws 13′ are backed down against the tops of the ends of the U-shaped member to maintain the parts at the desired spacing. FIGURE 5 shows the support for the bridging strap 10 in the form of a nipple 30 supported from the top of the outlet box and carrying a reducing bushing 31 which passes through the hole 15 in the strap 10 and receives a nut 32. This strap support may also be used for the bracket shown in FIGURES 1–3.

In FIGURE 6 the bridging strap 10″, with the usual shallow offset for stiffness, and the bracket 11″ are welded together.

The electrician, after assembling the fixture, places the bushing 12 and canopy C or C′ on the upper end of the cord. He then carries this assemblage up to where he can pass the cord through the hole 17 and tie the knot 12. The fixture can then be released to hang free and the splicing and grounding wire connections completed. The canopy and bushing are brought up and the bushing threaded into the hole 17. These may be readily lowered for inspection.

FIGURE 7 shows an L-shaped bracket 40 made of heavier stock (for example, 12 gage steel). It has a flange 41 adapted to be secured to the strap 10 or 10″ by a screw 42, which may be short as shown, or long and provided with a lock nut as in FIGURE 5. The bottom of the bracket has a threaded hole 43 for the bushing and has upwardly extending bifurcations 44. To keep the bracket 40 from turning about the screw, the bracket may be provided with a bump to fit a depression 45 in the bracket flange. With this construction the knot can be made in the cord and the end wires prepared for splicing and then the entire fixture, with canopy and bushing on the cord, can be hooked onto the bracket by passing the cord through the slot 46 between the bifurcations 44.

FIGURE 8 shows a modified form of construction. Here the bridging strap 50, with the usual shallow offset for stiffness, has downwardly bent prongs 51 with tapped holes, and the L-shaped bracket 52 has straight parallel sides 53 with slots 54, 54, and screws 55, 55 passing through the slots are threaded into the holes 54, 54. This arrangement also makes it possible to accommodate canopies of different depth.

Since it is obvious that the invention may be embodied in other forms and constructions within the scope of the claim, I wish it to be understood that the particular forms shown are but a few of these forms, and, various modifications and changes being possible, I do not otherwise limit myself in any way with respect thereto.

What is claimed is:

The combination with a cord supported fixture of a hanger therefor, said hanger comprising an elongated drop center metal strap having openings extending through the strap portions disposed between the drop center and the ends of the strap with at least one of said openings being elongated, said openings receiving fastening means securing said strap to spaced supports, said strap further including a relatively large central opening in the drop center portion and at least two adjoining smaller openings in said drop center portion, a unitary U-shaped bracket member removably carried by said metal strap, said bracket member having a bottom portion including a threaded opening therein and at least two legs extending upwardly therefrom, the upper ends of said legs being bent essentially at right angles to said legs and having holes extending therethrough, means removably engaging said holes in said bent end parts and said smaller openings in the drop center portion of said strap to hold the bottom portion of said U-shaped bracket in substantially parallel relationship with said strap, a cord having a knot disposed between the strap and said bottom portion, a canopy enclosing said bracket and strap and having an opening aligned with the bottom opening in said bracket and an insulating bushing surrounding said cord and engaging said canopy and bottom opening to secure the canopy in place and insulate the cord from the bracket, strap and canopy.

References Cited in the file of this patent

UNITED STATES PATENTS

| | | |
|---|---|---|
| 1,155,805 | Guth | Oct. 5, 1915 |
| 1,659,404 | Lipschutz | Feb. 14, 1928 |
| 1,685,620 | White | Sept. 25, 1928 |
| 1,760,003 | Russell | May 27, 1930 |
| 1,901,235 | Glowacki | Mar. 4, 1933 |
| 2,336,414 | Mitchell | Dec. 7, 1943 |
| 2,347,113 | King | Apr. 18, 1944 |
| 2,422,858 | Schockett | June 24, 1947 |
| 2,509,895 | Wakefield | May 30, 1950 |

FOREIGN PATENTS

| | | |
|---|---|---|
| 182,097 | Great Britain | Aug. 2, 1923 |